United States Patent
Willemoës

(10) Patent No.: US 10,170,219 B2
(45) Date of Patent: Jan. 1, 2019

(54) LOAD CARRYING BUNDLE INTENDED FOR USE IN A POWER CABLE OR A POWER UMBILICAL

(71) Applicant: AKER SOLUTIONS AS, Lysaker (NO)

(72) Inventor: Peter M. Willemoës, Mobile, AL (US)

(73) Assignee: AKER SOLUTIONS AS, Lysaker (NO)

( * ) Notice: Subject to any disclaimer, the term of this patent is extended or adjusted under 35 U.S.C. 154(b) by 0 days.

(21) Appl. No.: 15/021,628

(22) PCT Filed: Sep. 4, 2014

(86) PCT No.: PCT/NO2014/050161
§ 371 (c)(1),
(2) Date: Mar. 11, 2016

(87) PCT Pub. No.: WO2015/038002
PCT Pub. Date: Mar. 19, 2015

(65) Prior Publication Data
US 2016/0225489 A1 Aug. 4, 2016

(30) Foreign Application Priority Data
Sep. 12, 2013 (NO) .................................. 20131233

(51) Int. Cl.
*H01B 9/00* (2006.01)
*G01B 11/16* (2006.01)
(Continued)

(52) U.S. Cl.
CPC ............. *H01B 9/005* (2013.01); *D07B 1/145* (2013.01); *D07B 1/147* (2013.01); *F16L 11/22* (2013.01);
(Continued)

(58) Field of Classification Search
None
See application file for complete search history.

(56) References Cited

U.S. PATENT DOCUMENTS 4,371,234 A * 2/1983 Parfree ................ G02B 6/4416
385/101
4,508,934 A 4/1985 Feldman, Jr.
(Continued)

FOREIGN PATENT DOCUMENTS

CN 201081769 Y 7/2008
CN 201917690 U 8/2011
(Continued)

*Primary Examiner* — Dimary Lopez Cruz
(74) *Attorney, Agent, or Firm* — Birch, Stewart, Kolasch & Birch, LLP

(57) ABSTRACT

A load carrying bundle of elongate elements combined with a fiber optic cable for integration with an elongated structure to perform global strain monitoring using fiber optic strain sensors is described. The load carrying bundle is made up by a number of individual elongated strength elements, which individual elongated strength elements are laid in a helix around the, in the bundle, centrally located fiber optic cable sensor. The elongated strength elements are laid adjacent to each other enabling to perform both a protective enclosure of the fiber optic cable sensor and to provide frictional bonding between the fiber optic cable sensor and the elongated strength elements.

17 Claims, 5 Drawing Sheets

(51) Int. Cl.
  *G02B 6/44* (2006.01)
  *F16L 11/22* (2006.01)
  *D07B 1/14* (2006.01)
  *G01L 1/24* (2006.01)
  *H01B 7/04* (2006.01)

(52) U.S. Cl.
  CPC .............. *G01B 11/16* (2013.01); *G01B 11/18* (2013.01); *G01L 1/246* (2013.01); *G02B 6/4416* (2013.01); *G02B 6/4432* (2013.01); *D07B 2201/2096* (2013.01); *D07B 2205/3007* (2013.01); *D07B 2205/3025* (2013.01); *H01B 7/046* (2013.01)

(56) References Cited

U.S. PATENT DOCUMENTS

| | | | | |
|---|---|---|---|---|
| 5,125,062 A * | 6/1992 | Marlier | ................ | G02B 6/4416 174/70 R |
| 5,371,825 A * | 12/1994 | Traut | ................... | G02B 6/4416 174/70 R |
| 5,463,711 A * | 10/1995 | Chu | ..................... | G02B 6/4416 174/70 R |
| 5,495,547 A | 2/1996 | Rafie et al. | | |
| 6,141,473 A * | 10/2000 | Song | ................... | G02B 6/4408 385/109 |
| 6,283,206 B1 * | 9/2001 | Fraser | .................. | E21B 17/203 138/138 |
| 6,647,187 B2 * | 11/2003 | Consonni | ............. | G02B 6/4427 385/113 |
| 8,326,103 B2 * | 12/2012 | Stoesz | ................ | G02B 6/02209 385/100 |
| 8,921,692 B2 * | 12/2014 | Nelson | .................... | E21B 17/01 174/128.1 |
| 8,953,915 B2 * | 2/2015 | Sarchi | ...................... | G01K 11/32 385/101 |
| 9,207,419 B2 * | 12/2015 | Martin Regalado | .... | B21C 23/24 |
| 9,488,794 B2 * | 11/2016 | Stoesz | ..................... | G01L 1/242 |
| 2004/0258373 A1 | 12/2004 | Andreassen | | |
| 2005/0226584 A1 | 10/2005 | Williams et al. | | |
| 2009/0120632 A1 * | 5/2009 | Worman | ................ | H01B 7/045 166/65.1 |
| 2010/0012342 A1 | 1/2010 | Figenschou et al. | | |
| 2010/0054677 A1 * | 3/2010 | Figenschou | ............ | H01B 7/045 385/101 |
| 2012/0125596 A1 * | 5/2012 | Homa | ................... | E21B 47/123 166/66 |
| 2013/0048373 A1 * | 2/2013 | Fogg | ...................... | H01B 7/045 174/70 R |
| 2014/0060873 A1 * | 3/2014 | Chartier | ................ | H01B 7/045 174/15.6 |

FOREIGN PATENT DOCUMENTS

| | | |
|---|---|---|
| GB | 2 036 361 A | 6/1980 |
| GB | 2 368 921 A | 5/2002 |
| GB | 2 401 940 A | 11/2004 |
| NO | 852105 A | 5/1985 |
| NO | 328458 B1 | 2/2010 |
| WO | WO 84/00820 A1 | 3/1984 |
| WO | WO 2010/129942 A1 | 11/2010 |
| WO | WO 2010/136062 A1 | 12/2010 |
| WO | WO 2011/065842 A1 | 6/2011 |
| WO | WO 2013/125962 A1 | 8/2013 |

\* cited by examiner

LOAD CARRYING BUNDLE INTENDED FOR USE IN A POWER CABLE OR A POWER UMBILICAL

The present invention relates to a specially designed load carrying bundle of elongate elements combined with a fibre optic (FO) cable for integration with an elongate structure to perform global strain monitoring using fibre optic (FO) strain sensors.

Such a combined monitoring and load carrying bundle is in particular intended for integration into umbilicals and power umbilicals to be deployed from a laying vessel into deep waters. While the umbilicals are primarily designed to be able to transfer fluids, like hydraulic fluid, the power umbilicals are primarily designed to transfer large quantities of electric power. The power umbilicals can have one or more centrally located heavy gauge conductors to transfer the electric power. The conductors can be made of copper or aluminium.

The power umbilicals, sometimes just called power cables, find usage inter alia as DEH cables (Direct Electric Heating). They tend to be called power umbilicals, rather than power cables, when many of the elements from the more traditional "umbilical" are included in the cross section, typically the PVC filler elements. Such DEH cables are in most cases supplied with electric power by a dynamic power cable from the topside power supply, and connected subsea to a power cable.

Typical monitoring in umbilicals is:

Distributed Temperature Sensing (DTS)—provides distribution of temperature along the fibre optic sensor, for detection of hotspots and continuous thermal assessments.

Distributed/Discrete Strain & Temperature Sensor (DSTS)—provides distribution of temperature (as per DTS) in addition to strain data which can be analyzed to determine mechanical damage.

Distributed Vibration Sensor (DVS)—provides data on dynamic and acoustic events.

Integrity management of subsea infrastructure has become increasingly important as the quest for oil and gas extends to deep water and/or harsh operating conditions requiring ever more expensive equipment. Key to integrity management is the ability to monitor the loads in such equipment reliably. The monitoring systems themselves are also being subject to increasingly harsh environments which have led to significant increase in the use of high reliability optical fibre sensors for direct strain measurement.

Although the optical sensing technology has been available for a number of years the recent rapid adoption is due to a breakthrough in the way that optical fibre sensors are deployed. Optical fibres are now being embedded within a glass fibre/epoxy composite carrier to form a robust component suitable for handling offshore. The carrier provides resistance to damage during deployment and from extreme hydrostatic pressure. The installation process becomes a simple matter of strapping the carrier to the structure to be monitored. To date such instrumentation devices have been deployed on deck, by rope access teams and by divers. ROV deployments are currently planned.

Fibre optic strain sensors make the use of optical fibres that are able to transmit light over a long distance with minimal loss, making them ideal for telecommunications. Soon after their invention, it was discovered that the properties of the light inside the fibre could however be affected by physical conditions outside the fibre. This meant that the fibre itself could be used as both the sensing element and the communication path. Fibre optic cables are typically 250 microns diameter with the light transmission confined to the central core of the cable. Most optical fibre sensors operate by launching light into one end of the fibre and analysing the light reflected from the fibre.

Optical fibre Distributed Temperature Sensors (DTS) have been deployed down-hole to measure temperature profiles in the well bore for some time already. Measurements of such systems typically have a spatial resolution of meters and several minutes are required to take measurement with acceptable noise levels.

A whole new area of optical fibre sensors has evolved around the use of Fibre Bragg Grating sensors (FBG) since these components overcome many of the limitations of using standard untreated fibre as a sensor. An FBG is a series of stripes of alternating refractive index about 6 mm long inside the core of the optical fibre. The FBG was originally applied as a filter for telecommunication systems, but has been rapidly adopted by sensing applications.

The FBG reflects a wavelength of light that is dependent mainly on the pitch of the stripe in the grating and on the refractive index of the glass. As the fibre is pulled, the pitch of the stripes in the grating increases and the reflected wavelength increases. Monitoring the wavelength reflected from an FBG provides an absolute and repeatable measure of local linear strains at the location of the gratin. Unlike strain gauges the strain measured is highly directional and unaffected by transverse strains. Since the measurement is of wavelength, any instrumentation system is immune from variations in optical power in the system. Another advantage of optical FBG sensors is the ability to place several sensors at different locations in a single optical fibre, commonly referred to as multiplexing. By multiplexing sensors in this way, over a hundred sensors can be monitored from a single instrument using a single connection between the sensing fibre and the instrument. A known system named "Insensys fibre optic measurement system" is a compact card consuming only 3 W of power. It can use time of flight to distinguish different sensors in the fibre and can take over 2000 measurements per second.

Further, the accuracy and reliability of electrical resistive strain gauge systems depends on the integrity of the bond onto the structure. Even with a successful installation these surface mounted, fragile sensors are susceptible to physical damage particularly in the severe subsea and deployment operating circumstances.

The above named company has developed the concept of a composite carrier to house the optical fibres and then to fasten the composite barrier to the structure to be monitored. Handling and installing the sensors is now analogous to installing strakes onto a riser. The composite carrier can be moulded to any shape to fit the structure to be monitored. The fibre optic sensors are positioned precisely at predetermined locations on the carrier during manufacture of the sensor. The optical fibres are embedded inside the carrier and become an integral part of the carrier. The surrounding composite material ensures good strain transfer from the structure to the sensor and provides protection from the subsea environment and accidental damage during installation. The carrier is designed to flex with the structure to be monitored and it has been adequate to clamp or strap it to the structure to be monitored. The geometry of the composite carrier can be customised for each application to create a single point sensor or an array of many sensors measuring the profile of a parameter over a region of a structure.

The position and orientation of the optical fibre sensors within the composite carrier can be configured to measure strain in different orientations, enabling measurement of axial strain, pressure and bending. It can also provide real-time high speed data structural health monitoring and fatigue analysis.

Having discussed the above per se known FO cables embedded in a composite or matrix, with the addition of the features of the present invention, the main purposes with the invention are to obtain:
- further protection of the integrated FO cables,
- enable effective strain measurement,
- ensure minimal effect on umbilical cross section,
- provide ease of assembly during manufacture,
- being able to preassemble FO cable in a strength bundle and then assemble the bundle into the umbilical or power cable.

With full control on the above issues, a reliable way to monitor continuously the state of such umbilical and/or power cable is achieved, i.e. be able to monitor the integrity, possible displacements and location of such umbilicals.

According to the present invention a load carrying bundle of the introductory said kind is provided, which load carrying bundle is made up by a number of individual elongated strength elements, which individual elongated strength elements are laid in a helix around the, in the bundle, centrally located fibre optic cable, said elongated strength elements being laid adjacent to each other enabling to perform both a protective enclosure of the fibre optic cable and to provide frictional bonding between the fibre optic cable and the elongated strength elements.

In one embodiment each individual elongated strength element can be a carbon fibre rod. The carbon fibre rod is normally made of carbon fibres embedded in a matrix of resin.

In an alternative embodiment each individual elongated strength element can be a metal rod, such as steel.

In still an alternative embodiment, the individual elongated strength elements can be a combination of at least one carbon fibre rod and at least one metal rod.

Preferably, the fibre optic cable includes at least one optical fibre embedded in a composite carrier matrix such as polyurethane.

Further, each optical fibre can in turn be surrounded by a high temperature strain transferring coating, a strain transferring adhesive and a stainless steel enclosure.

The fibre optical cable may include both a strain sensing fibre filament and a temperature sensing fibre filament.

The number of individual elongated strength element can be like 6, 12 or 18, and the individual elongated strength elements can optionally be laid in more than one layer.

It is to be noted that the elongated strength elements are laid in a helix around the FO cable. Thus the strength elements inherently provide a protection of the FO cable. Moreover, the elongated strength elements are frictionally bonded to the cable by virtue of the capstan effect that exists in such an arrangement, similar to winding a rope a number of times around a pole and pulling it snug. Thus, tension in the elongated strength elements is transferred to the FO cable.

It is further to be noted that all elements in the umbilical are also helically laid up, also the polymer filler profiles. The filler profiles are separating each strength element and when the filler profiles are assembled form conduits encompassing the individual elements. Since all the elements are helically laid about the center of the power umbilical, they will contract inward when under tension. The inward contraction of these elements creates a normal force between the strength elements and the filler profile conduits and a resultant frictional force. These forces are transmitted radially through the polymer filler profile matrix to create load-sharing between non-load-bearing and load-bearing elements.

Further, according to the present invention, a power umbilical having a load carrying bundle according to any of the claims 1-8 is provided, which bundle is integrated into the cross section of the thereof, which power umbilical comprises:
- a number of electric high power cables for transfer of large quantities of electric power/energy;
- filler material in the form of stiff elongate polymer elements located at least partially around and between the number of electric cables, said number of electric cables and stiff elongate polymer elements being gathered in a twisted bundle by means of a laying and closing operation; and
- at least one additional plain load carrying element at a predetermined location in the cross section of the power umbilical,
- the number of electric cables, the stiff elongate polymer elements and the at least one load carrying element, are either laid in a continuous helix, or alternately laid, i.e. by continuously alternating direction, in the entire or part of the longitudinal extension of the power umbilical, to form a bundle.

Thus it is to be understood that normally, the load carrying bundle shall be pre-bundled prior to power umbilical closing.

In one embodiment the power umbilical comprises at least one fluid pipe in the cross section thereof, of metal and/or polymer material.

A protective sheath may, but not necessarily, encompasses the twisted bundle of electric power cables, the load carrying elements and the filler material.

In one embodiment the additional load carrying element(s) are either steel wire ropes or steel rods or a combination of them.

In still another embodiment the fluid pipes in the cross section also includes pipes for transport of other fluids like hydraulic fluid.

In still another embodiment the power umbilical further may further include regular electric signal wires and/or additional fibre optic conductors.

In still another embodiment the power umbilical may include at least one longitudinally extending channel for forced flow transportation of a cooling agent through said power umbilical in order to cool down the electric cables and their insulation material from a critical temperature value.

The cooling length of the power cable/umbilical may vary and can extend over a length such as 50-200 meters, where one crucial length regarding heat build up is in the section of open air from the umbilical hangoff point to the sea surface.

Further, according to the present invention, an umbilical having a load carrying bundle according to any of the claims 1-8 is provided, which bundle is integrated into the cross section of the thereof, which umbilical comprises:
- at least one fluid pipe for transfer of fluids like hydraulic fluid;
- filler material in the form of stiff elongate polymer elements located at least partially around and between the at least one fluid pipe, said at least one fluid pipe and stiff elongate polymer elements being gathered in a twisted bundle by means of a laying and closing operation; and at least one additional plain load carrying element at a predetermined location in the cross section of the umbilical, the at least one pipe, the stiff elongate polymer elements and the at least one load carrying element, are either laid in a continuous helix, or alternately laid, i.e. by continuously alternating direction, in the entire or part of the longitudinal extension of the umbilical, to form a bundle.

The base polymer filler material may be either one of polyethylene (PE), polyvinylchloride (PVC), polypropylene (PP) and acrylonitrile butadiene styrene (ABS). One may also consider a combination of such filler materials.

Other and further objects, features and advantages will appear from the following description of preferred embodiments of the invention, which is given for the purpose of description, and given in context with the appended drawings where:

Figure 1:
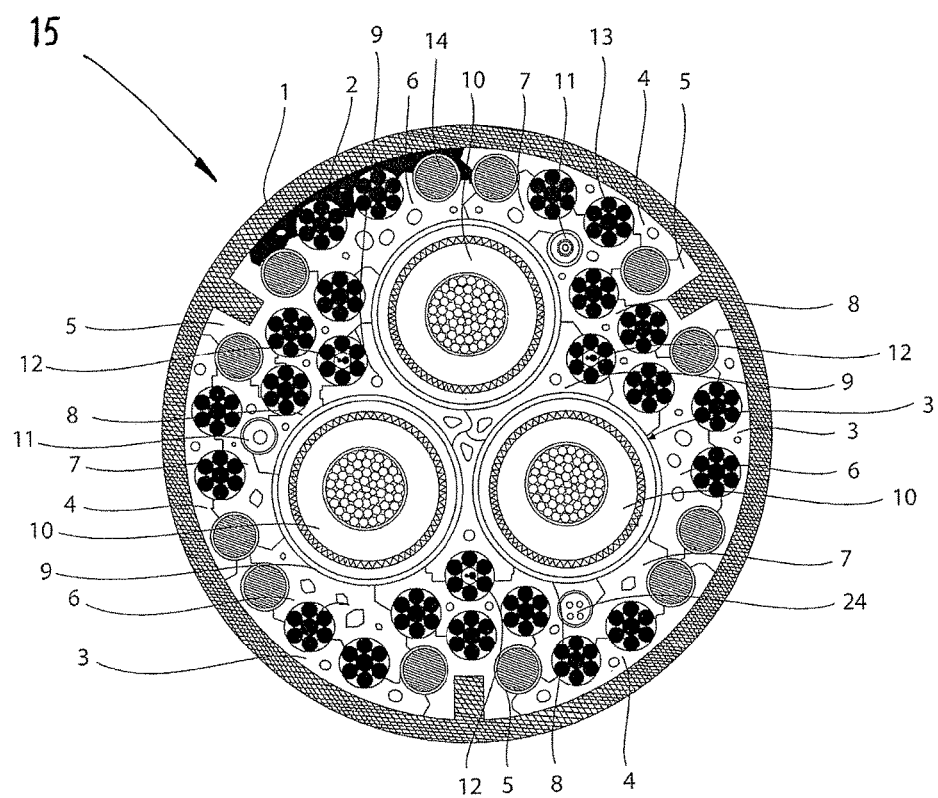
FIG. 1 shows a typical transverse cross sectional view of a power umbilical (cable) having three power conductors.

Reference is first made to FIG. 1 showing a power umbilical 15, also called a power cable by persons versed in the art. However, it is labeled a "power umbilical" because many of the elements in the cross section is picked from the more traditional "umbilical" basically designed to transfer fluids to the seabed. The power umbilical 15 has three power conductor cores 10 of substantial transversal cross section which are designed to transfer large quantities of electric power. The three power conductor cores 10 are normally made of copper, but aluminum and other conductive materials are also conceivable. A power umbilical normally is omit any fluid pipes, but can of course be added if desired for some projects. Just as an example, the OD of the shown power umbilical is approx. 250 mm.

Further elements in the cross section are a plurality of elongated load carrying elements 13 and elongated weight elements 14, in addition to regular fibre optic cables or conductors 11. The load carrying elements 13 are typically carbon fibre rods 13 made of carbon fibres embedded in a matrix of resin and formed into rods having an outer diameter of about 6.50 mm. In this cross section the carbon fibre rods 13 are numbered as many as 165.

The weight elements 14 are typically steel rods 14 which in turn are zinc plated for anticorrosion purposes. The steel rods 14 can as an example have an outer diameter of about 15.88 mm. Other materials are conceivable, like lead or other heavy weight metals. In the illustrated embodiment twelve such steel rods 14 are included in the cross section.

Also a PVC filler element 24 may be included in the cross section.

Finally there is a bundle of filler elements 2-9. The filler elements 2-9 are typically stiff elongate polymer elements, also called channel elements, or profiles, which are located at least partially around and between the electric power conductors 10, the load carrying elements 13, the weight elements 14 and the fibre optic conductors 11. In the depicted version there are three inner channel elements 9, three next inner and intermediate channel elements 8, six next outer and intermediate channel elements 7, 6, three next outer elements 5 and six outer channel elements 4, 3, 2. One element 2 is colored black to keep track during assembly of the umbilical. Otherwise they have the same cross section as the filler elements 3 which in turn are slightly different from the filler elements 4.

Each of these stiff elongate filler elements can, as mentioned, be manufactured of a polymer material. Such base polymer filler material is typically either one of polyethylene (PE), polyvinylchloride (PVC), polypropylene (PP) or acrylonitrile butadiene styrene (ABS).

As an example only, the power cable 15 can be a DEH cable having three heavy gauge conductors 10, each having a transversal cross section area of 630 $mm^2$, an outer diameter of 73.8 mm and a capacity of 36 kV.

The various channel elements 2-9 may have cooling fluid channels provided in their profile.

The very new element, here called the load carrying bundle B', is a combination of another FO cable and at least six load carrying elements 13. This FO cable acts as a FO cable sensor and is given the reference number 12. Each load carrying element 13 is normally a carbon fibre rod 13. The rods 13 are laid in a helix around the centrally located FO cable sensor 12. This bundle of sensor 12 and elements 13 is described in detail with reference to FIGS. 2 and 3. The remaining load carrying bundles B are made up by seven carbon fibre rods 13.

All the elements of the entire power umbilical are gathered in a twisted bundle that is made by means of a laying and closing operation in a per se known manner. A protective sheath 1, normally made of MDPE, is extruded onto and encompasses the entire bundle of the above listed elements. The outer sheath 1 also stabilizes the entire umbilical and keeps the elements together. However, the outer sheath 1 can be omitted and be replaced by strapping bands at certain intervals along the extension of the bundle, if desired.

Figure 2:
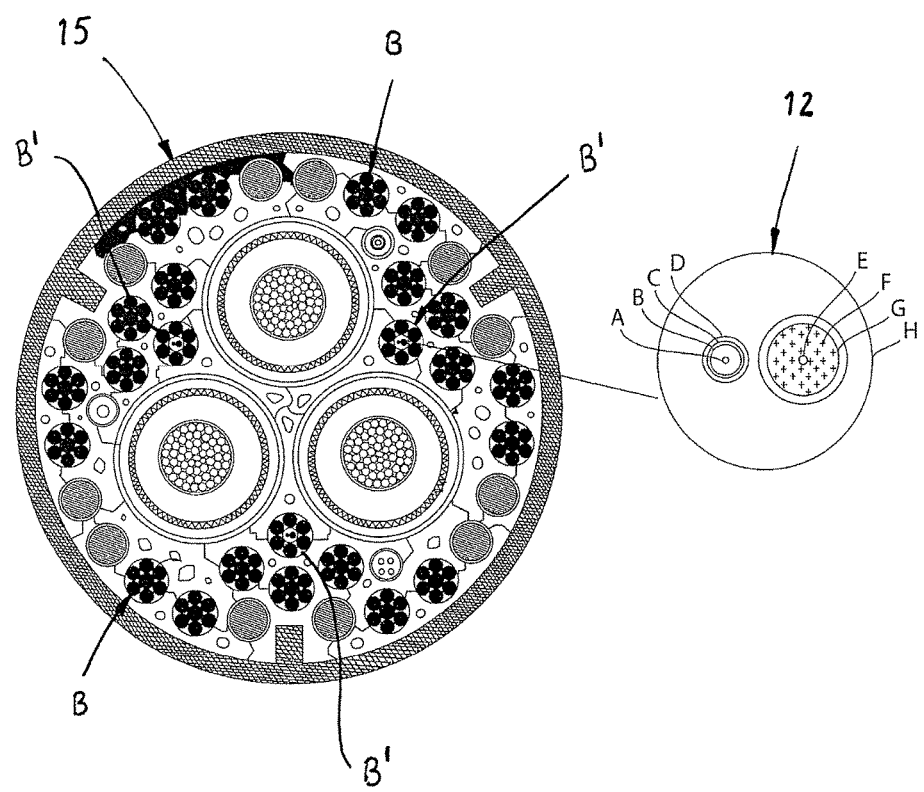
FIG. 2 shows an enlarged view of an integrated FO cable.

Reference is now made to FIG. 2 showing a cross sectional view of the FO cable sensor 12. The FO cable sensor 12 includes one strain sensing fibre filament A and a temperature sensing fibre element E, both embedded in a jacked of polyurethane H. Typical OD of the jacket is 6.7 mm+/−0.2 mm. As already stated, the FO cable sensor 12 is in turn surrounded by the six carbon fiber rods 13 laid in a helix around cable sensor 12. Typical OD of the carbon fiber rods are 6.5 mm.

The strain sensing fibre filament A can, as an example, be a Draka Bend insensitive single mode BendBright fibre (G.657) with a layer of 150° C. strain transferring coating. The strain sensing fibre element A is surrounded by a high temperature strain transferring coating B having OD: 900 μm. This is in turn surrounded by a strain sensitive adhesive C. All elements A, B and C are enclosed by a 304SS Stainless Steel FIMT; OD×ID: 1.42 mm×1.12 mm.

The temperature sensing fibre filament E can, as an example, be a Draka Single mode fibre (G.652.D) with layer 150° C. temperature transferring coating embedded in a gel F, like Unigel. Both elements E and F are enclosed by a 304SS Stainless Steel FIMT, EFL 0.45%+/−0.05%; OD×ID: 2.7 mm×2.3 mm.

Figure 3:
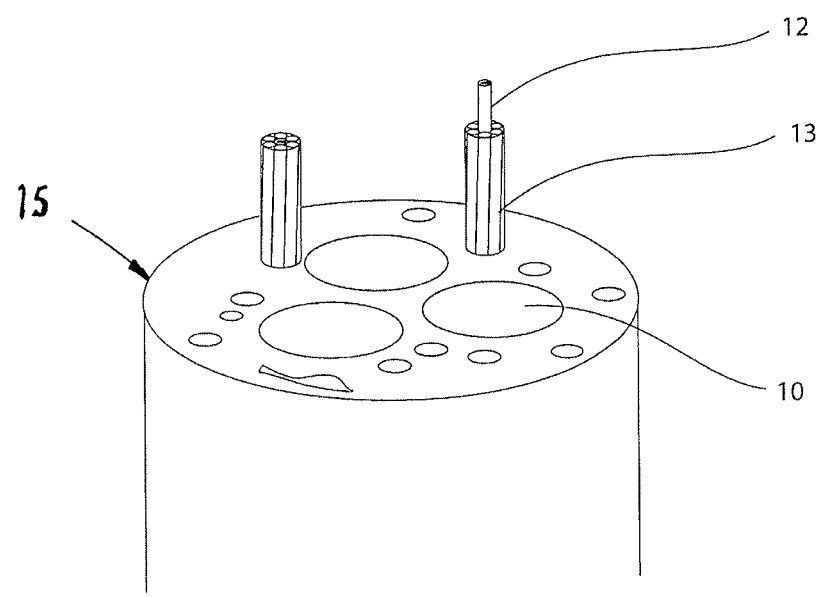
FIG. 3 shows in perspective view load carrying bundles according to the invention, extending out of the transversal cross section of a power umbilical.

FIG. 3 shows in perspective view load carrying bundles 12, 13 according to the invention, extending out of the transversal cross section of the power umbilical illustrated in transversal cross sectional view in FIG. 1. It is to be understood that the rods 13 extend in a helix, though not very visible or evident in the drawing. However, the laying length, or pitch length, is, as an example only, about 9 meters, i.e. one rotation every nine meters for elements that are only 6.5 mm in diameter. Thus it will be difficult to illustrate and show on the drawing.

One of the load carrying bundles B' have the centrally located FO cable sensor 12 extending out from the bundle of carbon fibre rods 13, just for illustration purposes.

Figure 4:
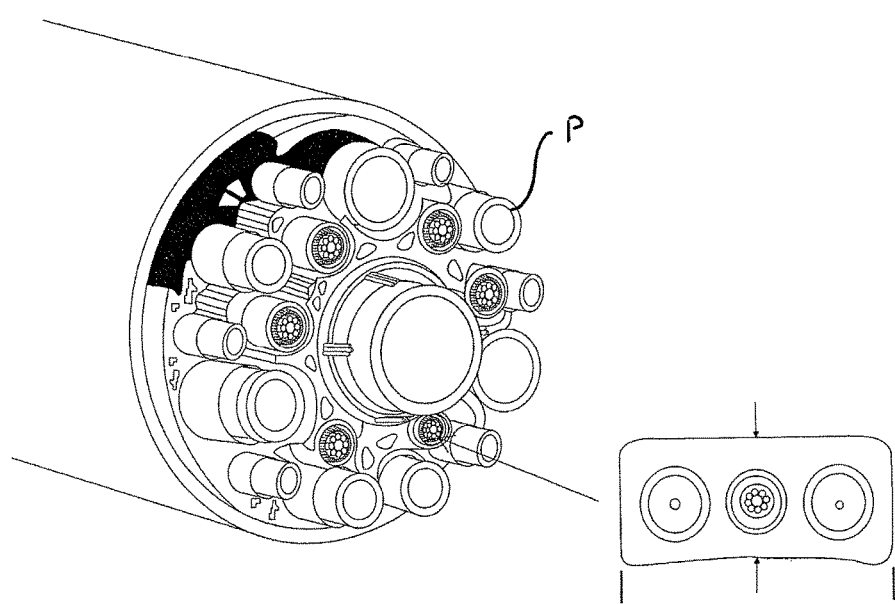
FIG. 4 shows a perspective view of an exemplary prior art umbilical having FO cables integrated.

FIG. 4 shows a perspective view of an exemplary umbilical having FO cables integrated into the cross section. This is an example of use of fibre optics in an umbilical which is considered as known per se. This umbilical also includes fluid pipes P.

Figure 5:
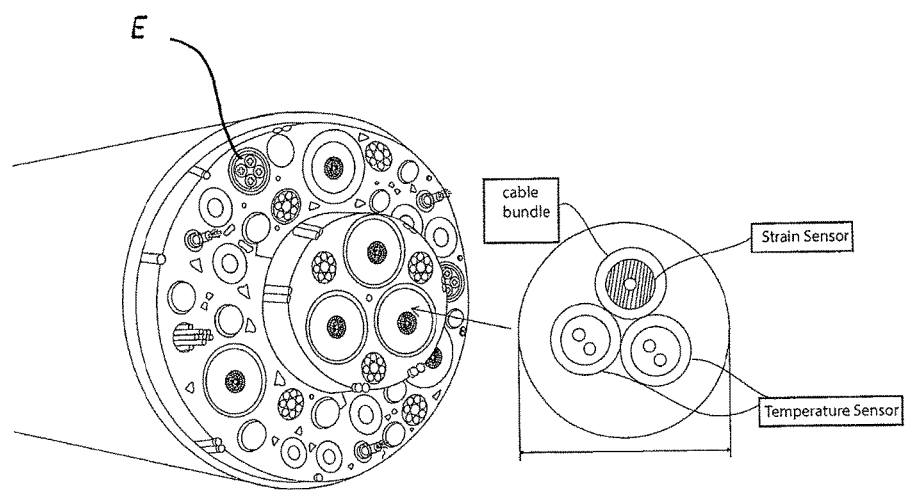
FIG. 5 shows a perspective view of an exemplary prior art power umbilical having FO cables integrated.

FIG. 5 shows a perspective view of an exemplary power umbilical having FO cables integrated into the cross section and regular electric signal wires E. This is another example of use of fibre optics which is also considered as known per se.

The invention claimed is:

1. A power umbilical comprising:
    a number of electric high power cables for transfer of large quantities of electric power/energy;
    filler material in the form of stiff elongate polymer elements located at least partially around and between the number of electric cables, said number of electric cables and the stiff elongate polymer elements being gathered in a twisted bundle by means of a laying and closing operation; and
    at least one first load carrying bundle made up of a number of load carrying elements arranged at a predetermined location in the cross section of the power umbilical,
    wherein the number of electric cables, the stiff elongate polymer elements and the at least one first load carrying bundle, are either laid in a continuous helix, or are alternately laid by a continuously alternating direction, in the entire or part of the longitudinal extension of the power umbilical, to form a power umbilical bundle,
    wherein the power umbilical further comprises:
    at least one second load carrying bundle comprising a centrally arranged integrated strain sensing fibre optic cable for global strain monitoring,
    and a number of individual elongated strength elements helically surrounding the centrally arranged fibre optic cable so that said load carrying elements are laid adjacent to each other to form both a protective enclosure of the fibre optic cable and to provide a frictional bonding between the fibre optic cable and the load carrying elements, said elongate polymer elements being assembled to form conduits respectively encompassing the load carrying elements of the at least one first load carrying bundle or the at least one second load carrying bundle.

2. The load carrying bundle according to claim 1, wherein each individual elongated strength element is a carbon fibre rod, which carbon fibre rod is made of carbon fibres embedded in a resin matrix.

3. The load carrying bundle according to claim 1, wherein each individual elongated strength element is a metal rod.

4. The load carrying bundle according to claim 1, wherein the fibre optic cable includes at least one optical fibre embedded in a composite carrier matrix such as polyurethane.

5. The load carrying bundle according to claim 4, wherein the at least one optical fibre is surrounded by a high temperature strain transferring coating, a strain transferring adhesive and a stainless steel enclosure.

6. The load carrying bundle according to claim 1, wherein the fibre optic cable include both a strain sensing fibre filament and a temperature sensing fibre filament.

7. The load carrying bundle according to claim 1, wherein the number of individual elongated strength element is 6, 12 or 18, wherein the number of individual elongated strength elements can optionally be laid in more than one layer.

8. The power umbilical according to claim 1, wherein the power umbilical comprises at least one fluid pipe in the cross section, of metal and/or polymer material.

9. The power umbilical according to claim 1, wherein a protective sheath encompasses the twisted bundle of electric power cables, the load carrying elements and the filler material.

10. The power umbilical according to claim 1, wherein the load carrying elements are either steel wire ropes or steel rods or a combination of steel wire ropes and steel rods.

11. The power umbilical according to claim 1, wherein the power umbilical further includes regular electric signal wires and/or additional fibre optic conductors.

12. The power umbilical according to claim 1, wherein the power umbilical further includes at least one longitudinally extending channel for forced flow transportation of a cooling agent through said power umbilical in order to cool down the electric cables and their insulation material from a critical temperature value.

13. An umbilical comprising:
    at least one fluid pipe for transfer of fluids like hydraulic fluid;
    filler material in the form of stiff elongate polymer elements located at least partially around and between the at least one fluid pipe, said at least one fluid pipe and the stiff elongate polymer elements being gathered in a twisted bundle by means of a laying and closing operation; and
    at least one first load carrying bundle made up of a number of load carrying elements arranged at a predetermined location in the cross section of the umbilical,
    wherein the at least one pipe, the stiff elongate polymer elements and the at least one first load carrying bundle, are either laid in a continuous helix, or alternately laid by a continuously alternating direction, in the entire or part of the longitudinal extension of the umbilical, to form an umbilical bundle, and
    wherein the umbilical further comprises at least one second load carrying bundle comprising a centrally arranged integrated strain sensing fibre optic cable for global strain monitoring, and a number of individual elongated strength elements helically surrounding the centrally arranged fibre optic cable so that said load carrying elements are laid adjacent to each other to form both a protective enclosure of the fibre optic cable and to provide a frictional bonding between the fibre optic cable and the load carrying elements, said elongate polymer elements are assembled to form conduits respectively encompassing the load carrying elements of the at least one first load carrying bundle or the at least one second load carrying bundle.

14. The umbilical according to claim 13, wherein a protective sheath encompasses the twisted bundle of the at least one fluid pipe, the load carrying elements and the filler material.

15. The umbilical according to claim 13, wherein the load carrying elements are either steel wire ropes or steel rods or a combination of steel wire ropes and steel rods.

16. The umbilical according to claim 13, wherein the at least one fluid pipe includes a plurality of fluid pipes for transport of multiple fluids.

17. The umbilical according to claim 13, wherein the umbilical further includes regular electric signal wires and/or additional fibre optic conductors.

\* \* \* \* \*